Oct. 28, 1941.   E. R. BARRETT   2,260,504
COUNTERBALANCED TAIL GATE
Filed Aug. 8, 1940   3 Sheets-Sheet 1
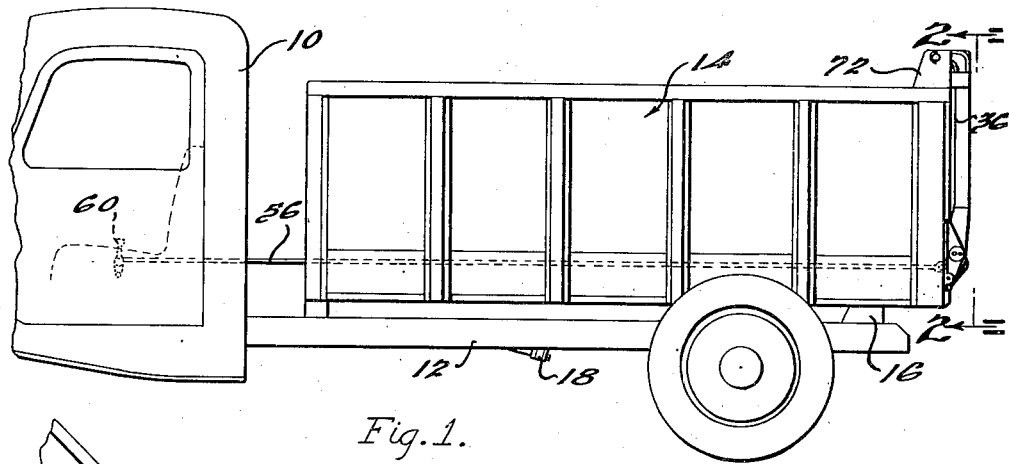
Fig.1.
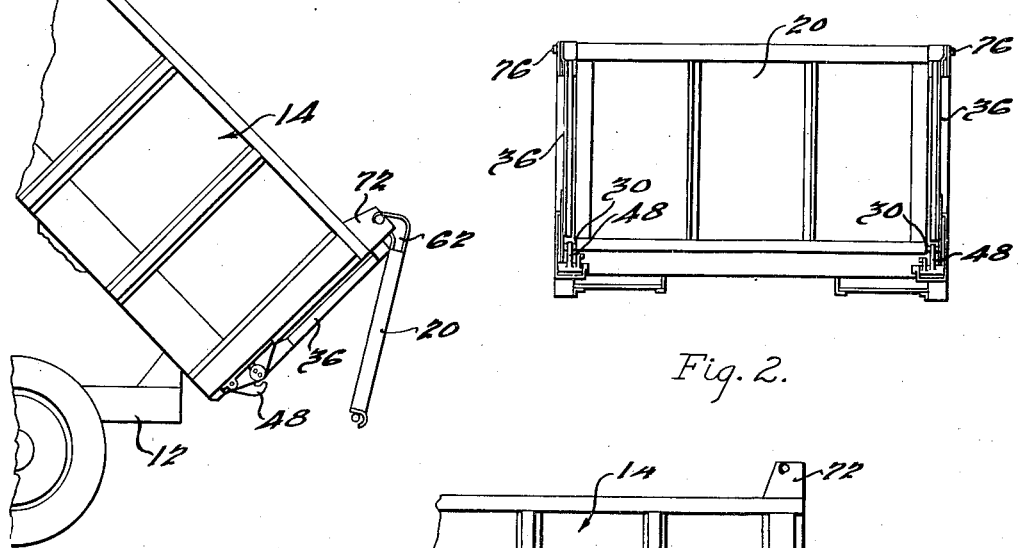
Fig.2.
Fig.3.
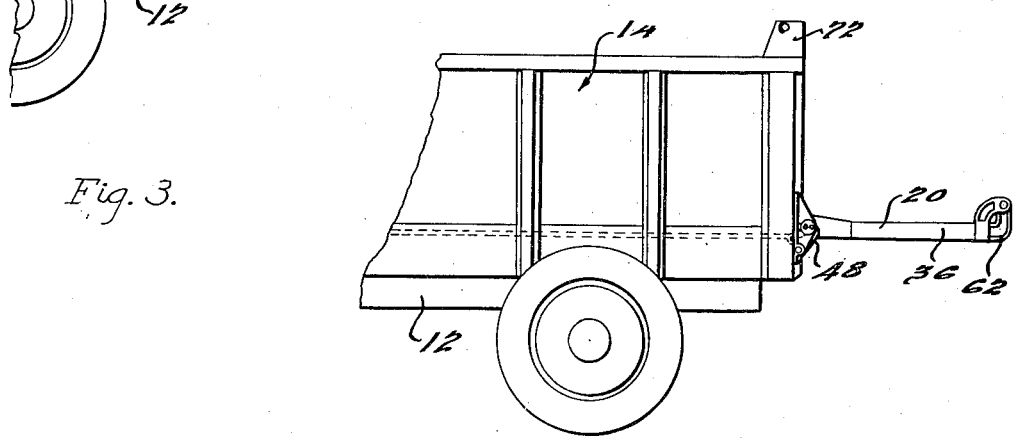
Fig.4.
INVENTOR
Edward R. Barrett
BY
Harness, Dickey & Pierce
ATTORNEYS

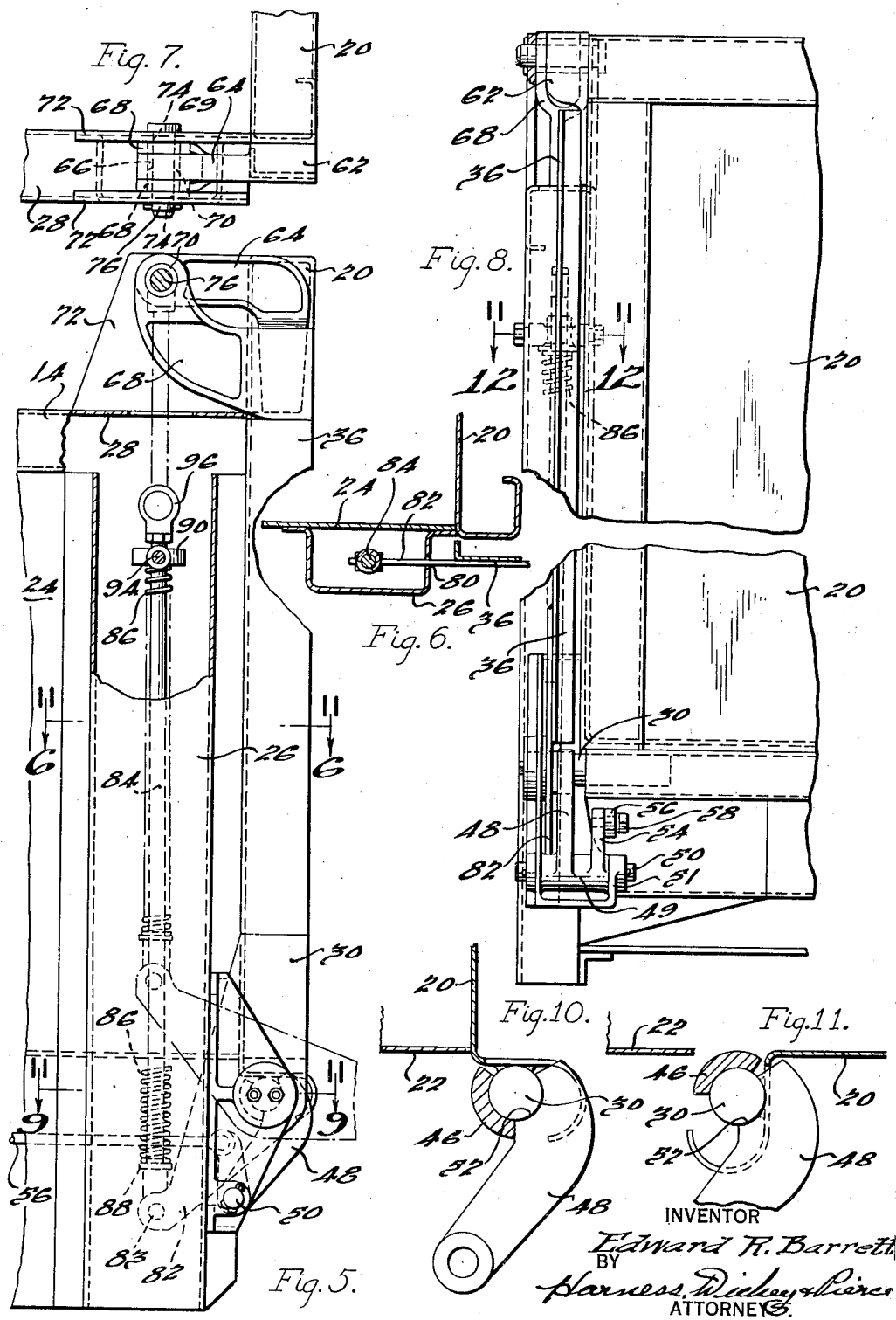

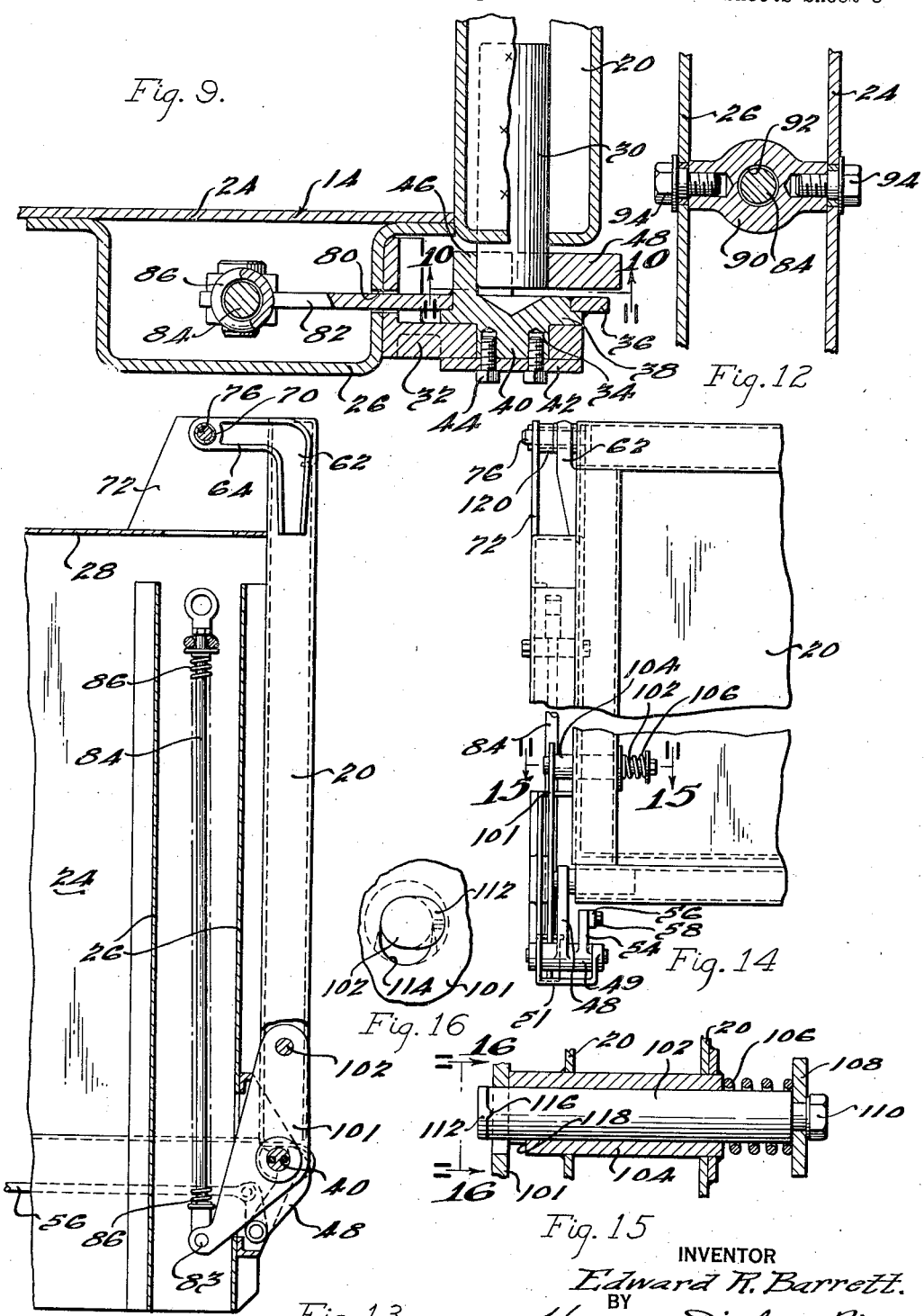

Patented Oct. 28, 1941

2,260,504

UNITED STATES PATENT OFFICE 2,260,504

COUNTERBALANCED TAIL GATE

Edward R. Barrett, Detroit, Mich., assignor to Gar Wood Industries, Inc., Detroit, Mich., a corporation of Michigan Application August 8, 1940, Serial No. 351,817

13 Claims. (Cl. 296—51)

The present invention relates to improved tail gate constructions, particularly of the type which are large and heavy and are used on large and heavy dump vehicles.

One of the primary objects of the present invention is the provision of an improved tail gate of the type mentioned which may be top-hung or bottom-hung, whereby the gate may be swung open from the top or bottom as desired and which is always connected to the body whether it is hung from either the top or the bottom.

Another object of the invention is to provide an improved tail gate which is counterbalanced in an improved manner so that when the gate is bottom-hung it may be opened or closed in an improved manner.

Another object of the invention is to provide an improved tail gate construction having improved means associated therewith for holding such gate in an open, horizontal position so that the tail gate is substantially flush with and forms a continuation of the floor of the vehicle body.

Other objects of the invention will become apparent from the following specification, the drawings relating thereto, and from the claims hereinafter set forth.

In the drawings, in which like numerals are used to designate like parts in the several views throughout:

Figure 1 is a fragmentary side elevational view of an automotive vehicle having a dump body with an improved tail gate, embodying features of the present invention, associated therewith;

Fig. 2 is a rear elevational view taken substantially along the line 2—2 of Fig. 1;

Fig. 3 is a fragmentary side elevational view of the structure illustrated in Fig. 1 showing the dump body in tilted position with the tail gate top hung;

Fig. 4 is a fragmentary side elevational view of the structure shown in Fig. 1 showing the dump body in its normal horizontal position with the tail gate bottom hung and open;

Fig. 5 is an enlarged, broken, side elevational view with parts removed showing parts in cross section of the rear end of the vehicle shown in Fig. 1 illustrating details of the tail gate and tail gate mounting and operating means;

Fig. 6 is a cross-sectional view taken substantially along the line 6—6 of Fig. 5;

Fig. 7 is a top elevational view of the structure shown in Fig. 5;

Fig. 8 is a broken, rear elevational view of the structure shown in Fig. 5;

Fig. 9 is a cross-sectional view taken substantially along the line 9—9 of Fig. 5;

Fig. 10 is a cross-sectional view taken substantially along the line 10—10 of Fig. 9;

Fig. 11 is a view similar to Fig. 10 with the parts in a different position and showing the tail gate bottom-hung and open;

Fig. 12 is a cross-sectional view taken substantially along the line 12—12 of Fig. 8;

Fig. 13 is a view similar to Fig. 5 showing a modified form of the present invention;

Fig. 14 is a broken, rear elevational view of the structure shown in Fig. 13;

Fig. 15 is a cross-sectional view taken with parts in elevation, taken substantially along the line 15—15 of Fig. 14; and Fig. 16 is an end elevational view taken substantially along the line 16—16 of Fig. 15.

Referring to the drawings, and referring particularly to Figs. 1 through 12 thereof, one embodiment of applicant's invention is illustrated. In Fig. 1, an automotive truck 10 is illustrated, including the usual chassis 12 having a dump body 14 mounted thereon for pivotal movement about the rear end thereof. Such pivotal movement may be effected about brackets 16 which are pivotally connected to the dump body 14 in the usual way. Suitable hydraulic hoist means, partially indicated at 18, are provided for raising and lowering the body about its rear pivots for dumping the same in the usual way.

A rear gate or tail gate 20 is provided which encloses the rear end of the body 14. The gate 20 is so mounted with respect to the body that it may be pivoted about the top thereof, as shown in Fig. 3, or may be pivoted about the bottom thereof, as shown in Fig. 4. When pivoted about the bottom, the gate 20 is substantially flush with the floor of the body and forms a continuation thereof. According to the present invention, means are provided which serve to counterbalance the weight of the gate when such gate is pivoted about the bottom thereof.

The means for pivotally mounting the gate about the top or bottom thereof, together with the counterbalance means, are illustrated in detail in Figs. 5 through 12. The body 14 includes a bottom 22 having side panels 24 connected thereto. Upright channel members 26 are fixed to the side panels 24 at the outer faces thereof at spaced intervals along the sides. The body is formed with horizontal portions 28 running along the top edges thereof which may be in the form of flanges or box section members as desired.

The gate 20 is pivotally connected along the bottom thereof through a pair of stub shafts 30 which are welded to the gate 20 adjacent the bottom thereof and project outwardly beyond the sides thereof. A mounting bracket 32 is fixed to the body 14 by welding to one of the side faces of the rear channel member 26. One of such bracket members and the associated mounting means are provided on each side of the body so that a description of one will be sufficient for an understanding of the construction and operation of both. The bracket 32 is provided with an opening 34 therethrough for pivotally mounting an arm member 36 with respect to the body. The arm member 36 is pivotally mounted intermediate its ends with respect to the body through a hub portion 38 which is welded to the member 36. The hub portion 38 is formed with an outwardly projecting annular portion 40 which is received within opening 34. A plate member 42 is fixed to the member 38 by means of screws 44 and bears against the outer face of member 32, as best shown in Fig. 9. It will thus be appreciated that the member 38, together with arm member 36, is pivotally mounted with respect to the bracket 32.

The member 38 is formed with an integral, inwardly projecting segmental portion 46 which is adapted to partially embrace a portion of the projecting end of stub shaft 30, and thereby forms a seat for such stub shaft and provides a portion of the means for releasably, pivotally connecting the gate 20 to the body for pivotal movement about the bottom thereof.

A pivoted member 48 having an integral hub portion 49 is pivotally mounted in the bracket 32 by means of a pivot pin 50. Such member 48 extends upwardly and rearwardly of stub shaft 30 and has an integral segmental portion 52 which is adapted to embrace a portion of the projecting end of stub shaft 30, as best shown in Figs. 10 and 11.

An upwardly projecting lever member 54 is formed integral with the hub portion 49 and has a forwardly extending rod member 56 pivotally connected thereto by means of a pivot pin 58. The forward end of rod member 56 is connected to an operating handle 60 mounted on the front of the body 14. By shifting the handle 60, it will be appreciated that the member 48 may be moved into engagement with the stub shaft 30, as shown in Figs. 10 and 11, or it may be moved away from and out of engagement with said stub shaft. When the member 48 engages the stub shaft, it will be seen that portion 52 thereof in cooperation with portion 46 of member 40 provides a pivot connection for the gate 20 for pivotal movement about the bottom thereof. When the member 48 is moved away from the shaft 30, on both sides of the body, the gate 20 is freed from such pivotal connection and may be thereby pivoted about the top thereof.

In order to releasably, pivotally mount the gate 20 about the top thereof, the gate 20 is provided with offset and forwardly extending bracket members 62. Such members 62 have forwardly extending portions 64, each of which is provided with a transverse opening 66 therethrough. The portion 64 is received within the sides of a forked member 68 rigidly connected to and forming an integral part of the upper end of arm 36. The sides of the fork 68 are provided with aligned openings 69 therethrough which are aligned with opening 66. In order to permanently and pivotally connect the arm 36 with respect to the gate 20, a sleeve 70 (Figs. 5 and 7) is disposed within the aligned openings 66 and 69.

A pair of upstanding bracket plates 72 are fixed to the top of the body 14 adjacent the rear end thereof and at each side. Each pair of members 72 is adapted to receive therebetween the forwardly projecting members 64 and 68. Aligned openings 74 are provided through the members 72 and the opening through sleeve 70 is adapted to be aligned with such openings 74. A releasable pivot pin 76 is then placed through openings 74 and through sleeve 70 to pivotally mount the upper ends of gate 20 and arm 36 with respect to the body. By removing pins 76, the gate 20, together with arms 36, are free to be pivoted about the bottom of the gate. With the pins 76 in the position shown and by releasing the members 48, the gate 20 is free to pivot about the top thereof, as shown in Fig. 3. The arm 36 does not pivot during such latter mentioned operation.

When the pins 76 are removed and the members 48 are in the position shown in Figs. 5, 10, and 11, the gate 20 is pivoted about the bottom thereof. Means are provided for counterbalancing the weight of the gate and also for holding the gate in its open and horizontal position. The lower end of each arm member 36 projects downwardly and forwardly through an elongated upright aperture 80, formed in member 26. The lower end of arm member 36 is indicated at 82 and such lower end is pivotally connected through pivot pin 83 to the lower end of an upright rod member 84 which is disposed within channel member 26. A spiral spring 86 embraces rod member 84 with the lower end thereof bearing against a stop washer 88, mounted on rod member 84. The upper end of spring 86 bears against the under side of a stop 90. Such stop 90 is provided with a central aperture 92 therethrough (Fig. 12), through which rod member 84 slidably extends. The member 90 is mounted between the outer face of channel 26 and side panel 24 by means of screws 94 which pass through aligned, sleeved apertures in such body members and are connected to member 90. The upper end of rod member 84, above stop 90, has an eye member 96 connected thereto.

The rod 84 is of such a length that when the gate 20, together with arm 36, is pivoted about the lower end of the gate to its horizontal position, the rod member 84 moves upwardly to such a position that the eye member 96 is aligned with openings 74 formed in plate members 72. The pins 76, at each side of the body, may then be passed through such aligned openings and through the eyes 96 so that the gate is held in its open horizontal position. When being moved to such position, the springs 86 compress and thus serve to counterbalance the opening action of the gate. Furthermore, such springs urge the gate to its closed position so that such gate may be closed with little effort.

Reviewing the operation of the elements heretofore described, when the members 48 are released from engagement with the stub shafts 30 through actuation of the rods 56, the gate may then pivot about pivot pins 76 at the top edge of the door and as shown in Fig. 3. At this time, the members 36 are in the position shown in Fig. 3, and the brackets 62 are pivotally connected to the pins 76 through the sleeve 70.

When the pins 76 are withdrawn, the upper end of the door is secured to the upstanding members 36 through the sleeve 70. The members 48 are then in the position shown in Figs. 10 and 11, so that the door 20 pivots about the shafts 30, along the bottom of the door. As the door drops about the bottom pivots, the springs 86, which are connected to the lower projections 82 of the members 36, will be compressed as such springs abut against the stops 90. The rod 84 at the same time moves upwardly, so that the eyes 96 thereof are aligned with the openings in brackets 72. The pins 76 may then be inserted in such openings and through the eyes 96 to hold the door in its open position. It will thus be appreciated that through the action of the springs 86, as they are compressed, the rear gate 20 is counterbalanced, and such springs tend to urge the gate upwardly to its closed position.

In Figs. 13 through 15, a modified embodiment of the present invention is illustrated. The means for pivotally mounting the gate about the bottom thereof is the same as in the embodiment described above. The action of springs 86 and rod members 84 is also the same as in the embodiment described above. In this embodiment, instead of extending the arm member 36 to the top of the gate 20, a corresponding arm member 101 is provided, at each side of the gate, which is pivotally connected to the body in the same manner as arm member 36 above described.

The upper end of each arm member 101 extends a portion of the distance only along the gate 20 from the bottom and is releasably connected to the gate 20 by means of a rotatable and slidable pin 102. A sleeve member 104 is fixed to the gate 20 at each side thereof, and projects outwardly beyond the adjacent side thereof to a position in abutting relationship with member 101. The pin 102 is slidably received within the sleeve 104 and is resiliently urged inwardly by means of a spiral spring 106 which embraces the inner end of pin 102. A washer 108 is fixed to the inner end of pin 102 by means of a set screw 110 and engages the inner end of spring 106. The outer end of spring 106 bears against the fixed sleeve 104 so that it will be appreciated that the pin 102 is normally urged inwardly.

The outer end of pin 102 is formed with an integral projection 112 at one side thereof, and the member 101 is formed with an opening 114 therethrough which has the same shape as the end of pin 102 together with projection 112. The back face of the projection 112 is formed with an inwardly directed tab 116.

A portion of sleeve 104, corresponding to the shape of the projection 112 and aligned with spring 114, is removed as indicated at 118.

In the drawings, the pin 102 is illustrated in such a position that member 101 is connected to gate 20 so that when the gate 20 is pivoted about the lower end thereof, the rod member 84 and springs 86 act to counterbalance the weight of the gate and also act to hold the gate in its horizontal open position as in the embodiment described above. Member 101 is released from connection with gate 20 when it is desired to pivot the gate 20 about the top thereof. It will be appreciated that to release the members 101, it is merely necessary to press the pins 102 outwardly and turn them slightly so that projection 112 no longer overlies a portion of member 101 but is aligned with opening 114. The pin 102 will then move inwardly so that the outer end thereof lies flush with or slightly inwardly of the outer end of sleeve 104 with the projection 112 received within the removed portion 118.

The upper end of gate 20 is pivotally mounted to the body as in the embodiment described above except that the forked portions 68 are not present and spacers 120 are used to take up the space between the plate members 72.

Formal changes may be made in the specific embodiments of the invention described without departing from the spirit of the invention, the scope of which is commensurate with the appended claims.

What is claimed is:

1. In a vehicle body, an upright gate, releasable means connecting said gate to said body for pivotal movement about the top of said gate, releasable means connecting said gate to said body for pivotal movement about the bottom of said gate, and counterbalance means associated with said gate effective to urge said gate to its closed position only when said first-named means is released and said second-named means is connected.

2. In a vehicle body, an upright gate, releasable means connecting said gate to said body for pivotal movement about the top of said gate, releasable means connecting said gate to said body for pivotal movement about the bottom of said gate, counterbalance means associated with said gate effective to urge said gate to its closed position only when said first-named means is released and said second-named means is connected, and means for securing said counterbalance means to hold said gate open.

3. In a vehicle body, an upright gate, releasable means connecting said gate to said body for pivotal movement about the top of said gate, releasable means connecting said gate to said body for pivotal movement about the bottom of said gate, and resilient counterbalance means associated with said gate effective to urge said gate to its closed position only when said first-named means is released and said second-named means is connected.

4. In a vehicle body, an upright gate, releasable means connecting said gate to said body for pivotal movement about the top of said gate, releasable means connecting said gate to said body for pivotal movement about the bottom of said gate, resilient counterbalance means associated with said gate effective to urge said gate to its closed position only when said first named means is released and said second named means is connected, and means for securing said gate against the action of said resilient counterbalance means to hold said gate open.

5. In a vehicle body, an upright gate, releasable means connecting said gate to said body for pivotal movement about the top of said gate, releasable means connecting said gate to said body for pivotal movement about the bottom of said gate, an arm member, means pivotally mounting said arm member intermediate the ends thereof with respect to said body, means connecting one end of said arm member to said gate, and resilient means connecting the other end of said arm member to said body, said last named means acting to counterbalance said gate and effective to urge said gate to its closed position when said first named means is released and said second named means is connected.

6. In a vehicle body, an upright gate, releasable means connecting said gate to said body for pivotal movement about the top of said gate, releasable means connecting said gate to said body for pivotal movement about the bottom of said gate, an arm member, means pivotally mounting said arm member intermediate the ends thereof with respect to said body, means connecting one end of said arm member to said gate, and resilient means connecting the other end of said arm member to said body, said last named means acting to counterbalance said gate and effective to urge said gate to its closed position when said first named means is released and said second named means is connected, and means for securing said last named means to hold said gate open.

7. In a vehicle body, an upright gate, releasable means connecting said gate to said body for pivotal movement about the top of said gate, releasable means connecting said gate to said body for pivotal movement about the bottom of said gate, an upright arm member, means pivotally connecting said arm member intermediate the ends thereof with respect to said body, means pivotally connecting the upper end of said arm member to said gate, resilient means connecting the lower end of said arm member with respect to said body, said last named connection being such that said resilient means is effective to urge said gate to its closed position when said first named means is released and said second named means is connected.

8. In a vehicle body, an upright gate, releasable means connecting said gate to said body for pivotal movement about the top of said gate, releasable means connecting said gate to said body for pivotal movement about the bottom of said gate, an upright arm member, means permanently connecting the upper end of said arm member to said gate adjacent the top of said gate, resilient means connecting the lower end of said arm member with respect to said body, said resilient means being effective to urge said gate to its closed position when said first named means is released and said second named means is connected, and means for limiting the action of said resilient means to thereby hold said gate open.

9. In a vehicle body, an upright gate, releasable means connecting said gate to said body for pivotal movement about the top of said gate, releasable means connecting said gate to said body for pivotal movement about the bottom of said gate, an upright arm member, means permanently and pivotally connecting the upper end of said arm member to said gate adjacent the top of said gate, an upright rod member, means pivotally connecting the lower end of said rod member to the lower end of said arm member, resilient means embracing said rod member, stop means associated with one end of said resilient means so that when said first named means is released and said second named means is connected, said resilient means is effective to urge said gate to its closed position, the construction being such that when said gate is pivoted about the bottom thereof, said rod member moves upwardly so that the upper end thereof is aligned with said first named means and may be secured to hold said gate open.

10. In a vehicle body, an upright gate, releasable means connecting said gate to said body for pivotal movement about the top of said gate, releasable means connecting said gate to said body for pivotal movement about the bottom of said gate, an upright arm member, means releasably connecting the upper end of said arm member to said gate, resilient means connecting the lower end of said arm member with respect to said body, said resilient means being effective to urge said gate to its closed position when said first named means is released and said second named means is connected, and means for limiting the action of said resilient means to thereby hold said gate open.

11. In a vehicle body, an upright gate, releasable means connecting said gate to said body for pivotal movement about the top of said gate, releasable means connecting said gate to said body for pivotal movement about the bottom of said gate, an upright arm member, means releasably connecting the upper end of said arm member to said gate intermediate the top and bottom of said gate, an upright rod member, means pivotally connecting the lower end of said rod member to the lower end of said arm member, resilient means embracing said rod member, stop means associated with one end of said resilient means so that when said first named means is released and said second named means is connected, said resilient means is effective to urge said gate to its closed position, the construction being such that when said gate is pivoted about the bottom thereof, said rod member moves upwardly so that the upper end thereof is aligned with said first named means and may be secured to hold said gate open.

12. In a vehicle body, an upright gate, releasable means connecting said gate to said body for pivotal movement about the bottom of said gate, means pivotally connected to said body, and means permanently and pivotally connecting said last-named means to said gate adjacent the top thereof.

13. In a vehicle body, an upright gate, releasable means connecting said gate to said body for pivotal movement about the top of said gate, releasable means connecting said gate to said body for pivotal movement about the bottom of said gate, an arm member, means pivotally connecting said arm member with respect to said body, and means permanently and pivotally connecting said arm member to said gate adjacent the top thereof, whereby said gate is attached to said body at all times.

EDWARD R. BARRETT.